J. E. GOODWIN.
CONTROLLING DEVICE FOR WATER HEATING SYSTEMS.
APPLICATION FILED MAY 16, 1913.
1,095,105.
Patented Apr. 28, 1914.
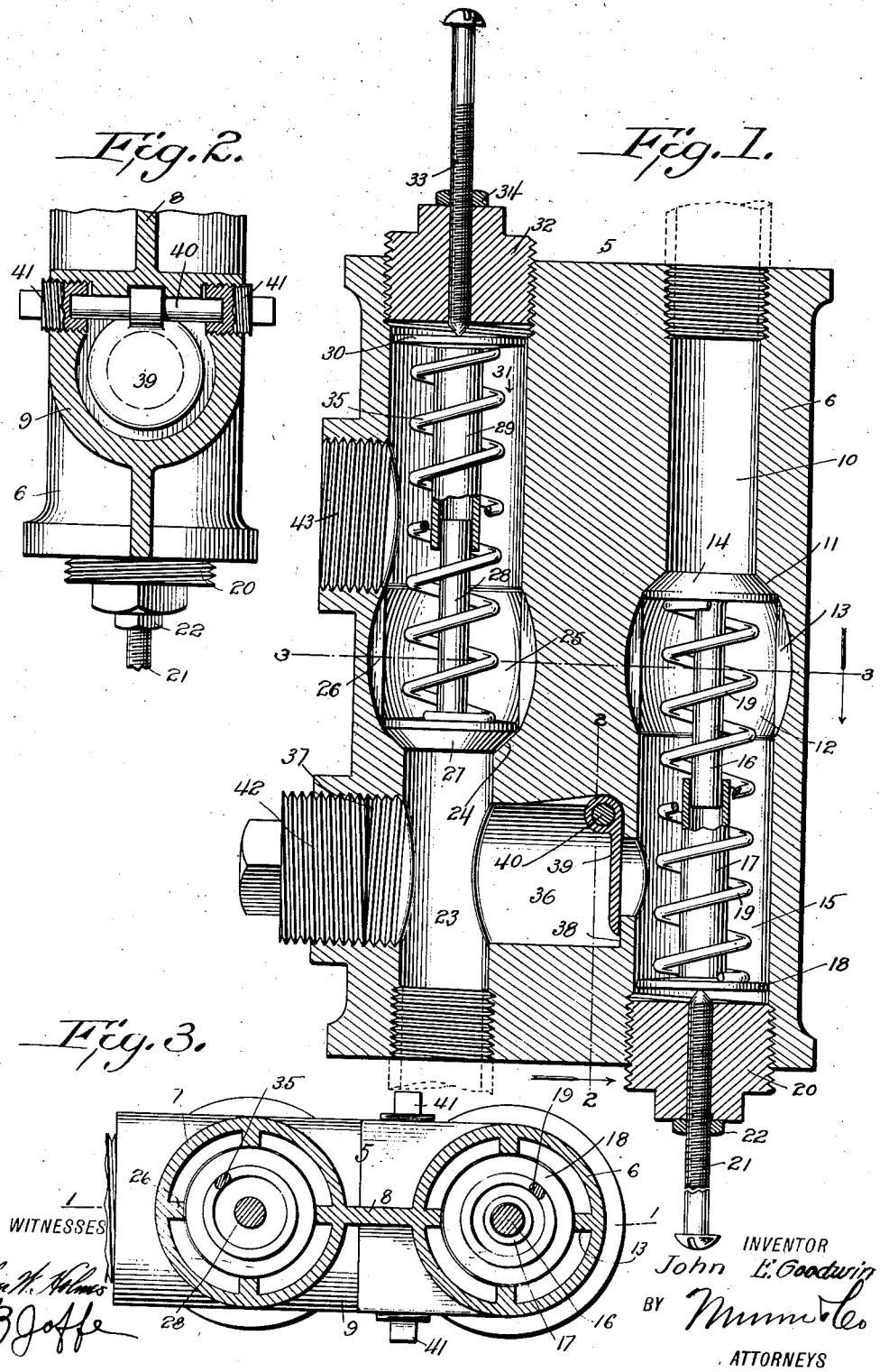

UNITED STATES PATENT OFFICE.

JOHN EDWIN GOODWIN, OF NORWOOD, MASSACHUSETTS.

CONTROLLING DEVICE FOR WATER-HEATING SYSTEMS.

1,095,105.

Specification of Letters Patent.

Patented Apr. 28, 1914.

Application filed May 16, 1913. Serial No. 768,026.

*To all whom it may concern:*

Be it known that I, JOHN E. GOODWIN, a citizen of the United States, and a resident of Norwood, in the county of Norfolk and State of Massachusetts, have invented a new and Improved Controlling Device for Water-Heating Systems, of which the following is a full, clear, and exact description.

An object of my invention is to do away with so-called expansion tanks used in connection with water-heating systems and generally constituting a source of trouble in the system.

Another object of the invention is to provide a simple, inexpensive and reliable device, easily accessible for inspection, and which, due to its construction, causes a quicker circulation of the water in the pipes of the system therefore permitting a reduction in the diameter of the same.

The above objects are obtained by providing a casing having two valve-controlled communicating openings, one of said valves being a relief valve and the other a pressure reducing valve.

The invention consists of the construction and combination of parts to be more fully described hereinafter and fully set forth in the claim.

Reference is to be had to the accompanying drawings forming a part of this specification, in which like characters indicate corresponding parts in all the views and in which:

Figure 1 is a vertical section through an embodiment of my invention on line 1—1, Fig. 3; Fig. 2 is a section on line 2—2, Fig. 1 in the direction of the arrow; and Fig. 3 is a section on line 3—3, Fig. 1 in the direction of the arrow.

In the appended drawings, 5 represents the casing formed of two vertical cylindrical portions 6 and 7 united by a web 8 and also by a horizontally disposed cylindrical portion 9. The cylindrical portions are preferably flanged at the ends so as to reinforce the structure. The cylindrical portion 6 of the casing 5 is provided with a central through bore divided into three parts. The portion 10 of the bore ends in a valve seat 11 entering the portion 12 provided with guides 13 for the valve 14 contacting with the valve seat 11. The distance between the diametrically opposite guides 13 is substantially equal to the major diameter of the valve 14 and to the diameter of the third portion 15 of the bore. The valve 14 is provided with a stem 16 engaged in a tubular member 17 having a head 18 fitting snugly into the bore 15, this head 18 forming a guide for the tubular member 17 in the bore 15. Interposed between the valve 14 and the head 18 and engaging the stem 16 and the tubular member 17 is a coil spring 19 tending to separate the valve from the member 17. Engaging the end of the bore 15 is a threaded plug 20 carrying centrally a screw 21 which engages the head 18 of the member 17. The screw 21 is also provided with a lock nut 22. By means of this screw the resiliency of the spring can be varied. The cylindrical portion 7 of the casing 5 is similarly provided with a through central bore divided into three parts but disposed oppositely to the parts of the bore in portion 6. That is, the portion of the bore 23 similar to portion 10 is at the opposite end of the casing 5. It ends, similarly, in a valve seat 24 entering the second part of the bore 25 provided with guides 26 for valve 27 engaging the seat 24. The valve 27 is provided with a stem 28 engaging a tubular member 29 having a head 30 fitting snugly in a bore 31. The bore 31 is, similarly to the bore 15, provided with a plug 32 having a central screw 33 engaging the head 30 of the tubular member 29. The screw 33 is locked in the plug 32 by means of a lock nut 34. A coil spring 35 engages the valve and tubular member similarly to the coil spring 19 previously described. From the above description it can be seen that all the parts in the cylindrical portion 7 are similar and in same relation as the parts in cylindrical portion 6.

The horizontal cylindrical portion 9 is provided with a central bore 36 establishing communication between the bore 23 of the cylindrical portion 7 and bore 15 of cylindrical portion 6. The bore 36 has a threaded outlet 37 from the cylindrical portion 7, the purpose of which will appear hereinafter. The bore 36, adjacent the bore 15 of the cylindrical portion 6, is reduced in diameter so that a valve seat 38 is formed; and engaging this valve seat is a check valve 39 pivotally mounted on a pin 40. The pin 40 bears in lugs 41 inserted from the exterior sides of the cylindrical portion 9. The check valve 39 is passed into position through the threaded outlet 37, which is then closed by a plug 42.

The bore 10 at the end of the casing is threaded and receives the city water supply pipe; and the bore 23, similarly threaded at the end of the casing, is connected to the boiler. By means of the water supply the system is filled with water, the pressure of the city supply being diminished to the desired amount by means of the resistance of the coil spring 19. That is, for example, if the city supply system has 110 lbs. pressure and it is only desired to have a pressure of 20 lbs. from the city supply, the resistance of the coil spring 19 is made to equal 90 lbs. This will give a pressure from the city supply equal to 20 lbs. A 20-lb. pressure will raise water 46 ft., as the static pressure of water is .433 lbs. per ft. If the boiler works on a range of expansion of 10 lbs., the valve 27 will have to be made to raise at 30 lbs. pressure; that is, the coil spring 35 is adjusted by means of the screw 33 and lock nut 34 so as to respond to the boiler pressure of 30 lbs. The bore 31 in the cylindrical portion 7 is provided with a threaded outlet 43 to which a drip pipe is secured and through which the water flows out when there is an excess of pressure in the boiler causing the valve 27 to rise.

If it is desired to have a higher speed of the flowing water in the pipes, the pressure of the water from the city supply can be raised by reducing the pressure on the valve 14; and to maintain the same expansion range of the boiler of 10 lbs. the compression on the valve 27 is increased by means of the adjustment of the spring 35. From this it will follow that while the boiler range remains the same the boiler works under a higher pressure, consequently, the speed of the flowing water will be increased, and that will permit a reduction in the diameter of pipes, since the same quantity of water is used.

The purpose of the check valve 39, shown in the drawing, is only to prevent the hot water from the boiler, when there is an excess of pressure, from flowing into the bore 15, whereby it will come in contact with the coil spring 19. As it can be easily seen, the device will operate without the check valve 39, as the tendency of the valve 14 is to check the inflow from the city supply.

The device is generally placed near the boiler, a few feet from the ground, so that the same can be easily accessible for inspection. It is understood that the relative tension of the springs 19 and 35 can be previously adjusted by knowing the city water supply pressure and the desired diameter of the pipe to be used.

Having thus described my invention, what I claim as new and desire to secure by Letters Patent is:

The combination of a water-heating system, including a boiler with a controlling device, comprising a casing having two parallel bores and a transverse bore connecting the two parallel bores; valves in said parallel bores, one controlling the inlet pressure to the system, the other forming the relief for the system, and a check valve in the transverse bore, each of the valves in the parallel bores having a stem; a tubular member having a head fitting snugly into each bore engaging said stems; a coil spring on the stem and the tubular member in engagement with the valve and the head and normally tending to separate the tubular member from the valve; a plug in each of said bores; and a threaded member in said plug engaging said head whereby the tension of the springs can be varied, substantially as and for the purpose set forth.

In testimony whereof I have signed my name to this specification in the presence of two subscribing witnesses.

JOHN EDWIN GOODWIN.

Witnesses:
MADELENE ANASTASIA SCHELL,
HENRY EDWARD SCHELL.